United States Patent [19]

Mickowski

[11] 4,280,182
[45] Jul. 21, 1981

[54] MICROCOMPUTER CONTROL SYSTEM

[76] Inventor: John Mickowski, 129 Main St., Franklin, N.J. 07416

[21] Appl. No.: 38,387

[22] Filed: May 14, 1979

[51] Int. Cl.³ .................................. G06F 15/46
[52] U.S. Cl. .......................... 364/475; 318/567; 364/107
[58] Field of Search ........ 364/107, 475, 200 MS File, 364/900 MS File; 318/567–569

[56] References Cited

U.S. PATENT DOCUMENTS

| 3,370,492 | 2/1968 | Treff | 364/475 |
| 3,498,167 | 3/1970 | Hill | 364/475 |
| 4,062,213 | 12/1977 | Schneider et al. | 364/475 |
| 4,074,349 | 2/1978 | Ueda | 364/107 |
| 4,115,858 | 9/1978 | Kaufman | 364/107 |
| 4,123,750 | 10/1978 | Leney et al. | 364/107 |

Primary Examiner—Errol A. Krass
Attorney, Agent, or Firm—Eugene Lieberstein

[57] ABSTRACT

A microcomputer control system for operating a die press stamping machine comprising a microprocessor including data storage memory means, means for programming the memory with data representing the coordinates of each machine position in a sequence defining a multiple number of cutting programs means for selecting a predetermined cutting program, means for displaying each address position within the microprocessor memory and means for selectively introducing machine coordinate data within memory at the displayed address position.

6 Claims, 14 Drawing Figures

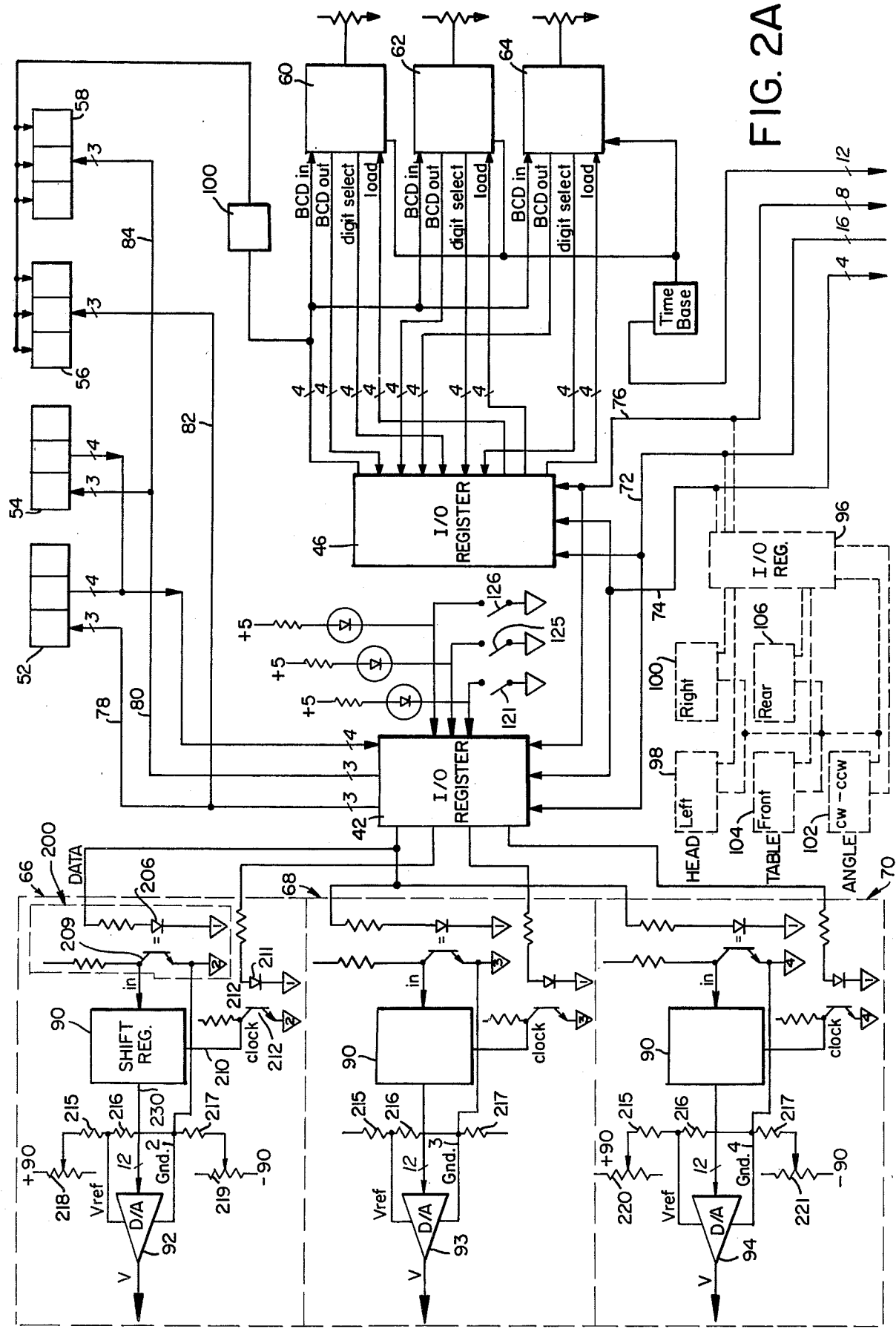

MICROCOMPUTER CONTROL SYSTEM

This invention relates to a microcomputer control system for operating a die press machine.

A conventional die press machine is used to stamp out a pattern, corresponding to the shape of the die, from stock material of any given composition such as, for example, paper, leather and metal. In the manufacture of paper envelopes, for example, the die is repeatedly driven through a stack of paper sheets following a prescribed path defined by a sequence of "machine positions." The machine positions are calculated in advance by the operator of the press to optimize the number of die cuts through the stack of sheets for each separate die pattern and size sheet. Each "machine position" is defined by three variables referred to in the art as the "head," "table" and "angle" positions respectively. These three variables define the coordinates of the die press along two rectilinear reference axes, viz, the "X" and "Z" axis in combination with the angular orientation of the die about a third vertical rectilinear axis. A separate die is used to form each different envelope pattern and, in general, for each different size of envelope. During the course of a business year hundreds and in some cases thousands of different die shapes and sizes may be used to produce all of the different envelope patterns. Accordingly, a different series of machine positions must be established anew for each die.

Currently, die presses are manufactured with a multiplicity of position control elements such as potentiometers for storing the machine positions for any given die pattern. One typical hydraulic die press, for example, employs 150 ten turn potentiometers to provide a 50 position maximum capability. A set of three potentiometers define a machine position. This permits a maximum storage of two to three separate cutting programs for the typical user. The coordinate information stored in the potentiometers is scanned at a predetermined rate and sequence by an electromechanical stepper switch which delivers the information to a servo drive system associated with each machine coordinate for operating the press. To provide greater storage flexibility would require additional potentiometers. A system dependent upon the use of multiple potentiometers is inherently limited in capacity, and susceptible to error. The accuracy of the cutting program is dependent upon the accuracy of each potentiometer which, with age, is subject to drift due to variations in its temperature coefficient. Moreover, the electromechanical stepper switch requires periodic maintenance and adjustment to avoid inaccuracy and error. Even a minor amount of dirt can cause inaccurate machine die cutting resulting in high scrap rates.

Accordingly, it is the principal object of the present invention to provide a microcomputer control system for operating a die press machine in which an unlimited number of die cutting programs may be stored;

It is a further object of the present invention to provide a microcomputer control system for operating a die press in which each die cutting program may be readily accessed for use and/or modification without impairing or changing other cutting programs;

It is an even further object of the present invention to provide a microcomputer control system which permits manual "shrink" and "stretch" adjustment of the machine position control signals to accommodate for minor variations in pattern size without reprogramming.

Further objects and advantages of the present invention will become apparent from the following detailed description of the invention when read in conjunction with the accompanying drawings of which:

FIGS. 2A, 2B and 2C represent in combination a more elaborate block diagram of the microcomputer control system of FIG. 1;

FIG. 3 is a circuit schematic diagram of the head display module in FIG. 2a;

Figure 1:
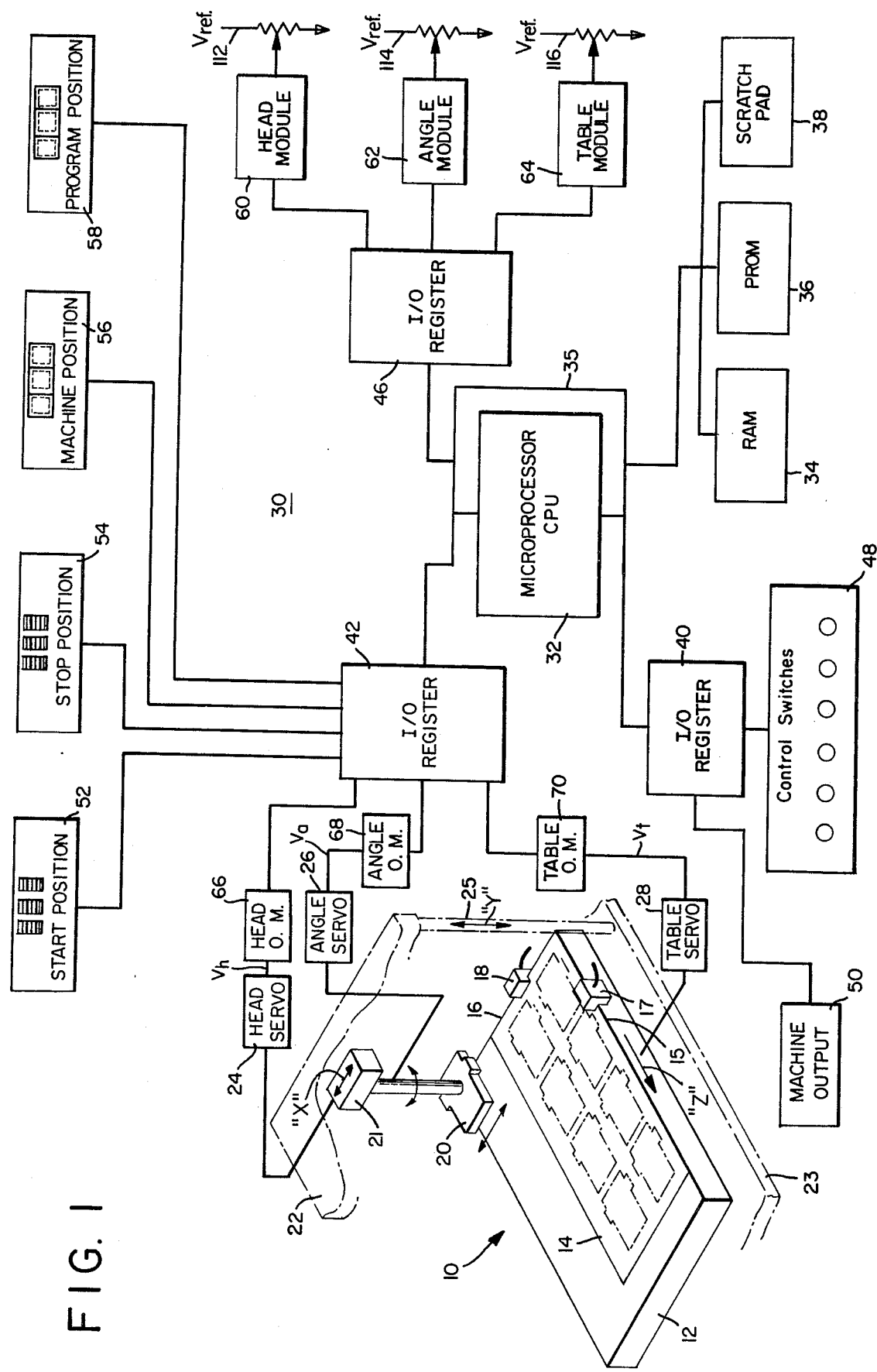
FIG. 1 is a simplified diagrammatic illustration of a conventional die press machine in combination with a functional block diagram of the microcomputer control system of the present invention.

Referring now to FIG. 1 in which a conventional die press machine 10 is diagrammatically shown having as its basic structure a movable table 12 upon which a stack of paper 14 is laid out with two ends clamped against the side surfaces 15 and 16 of the table 12 by clamps 17 and 18. A cutting die 20 is supported in a head assembly 21 mounted in a reciprocating press ram 22. The head assembly 21 is movable about a horizontally disposed carriage (not shown) along the "X" axis. The table 12 is slidably supported in a housing 23 for movement along a "Z" axis perpendicular to the direction of movement of the head assembly 21 as indicated in the drawing. A first servo positioning system 28 controls the linear movement of the table 12 along the "Z" axis. The press ram 22 is connected to the housing 23 through a plurality of hydraulically operated piston-cylinder actuating devices 25 (only one of which is shown) which reciprocates the press ram 18 in a vertical direction along the "Y" axis to perform the die stamping operation. The piston-cylinder actuating devices 25 are automatically energized in a conventional manner so as to make one complete stroke in synchronism with each advance of the cutting die 20 to a new machine position.

The head assembly 21 which supports the cutting die is controllably driven along the "X" axis by a second servo positioning system 24. A third servo positioning system 26 is coupled to the cutting die 20 for rotating the cutting die 20 about the "Y" axis into any desired angular positon hereafter referred to as the "angle" position of the cutting die 20. The position of the cutting die 20 along the "X" axis shall hereafter be referred to as the head position and the position of the table 12 along the "Z" axis as the table position.

The mechanical components including drive motors, gearing, carriage and linkage for moving the table 12 along the "Z" axis, the head assembly 21 along the "X" axis and for angularly rotating the cutting die 20 about the "Y" axis are conventional and do not form a part of the present invention.

The first, second and third servo positioning systems 24, 26 and 28 respectively are conventional servo drive feedback systems for controlling the position of the table 12, head assembly 21 and cutting die 20 in response to machine position control signals $V_h$, $V_a$ and $V_t$ received from the microcomputer control system 30 of the present invention. The machine position control signals $V_h$, $V_a$ and $V_t$ identify the head, angle and table coordinates corresponding to each machine position and may be supplied to the die press 10 as analog or digital signals depending upon the type of conventional die press machine 10 to be controlled. In one embodiment of the invention, $V_h$, $V_a$ and $V_t$ are analog voltages applied to the servo drive positioning systems 24, 26 and 28 to operate the head, angle and table respectively. In a second embodiment of the invention digital signals representing the machine positions are generated for use an input signals to a conventional binary coded decimal thumb switch input control and a digital to analog converter before application to the servo drive positioning systems 24, 26 and 28 respectively. In each embodiment the servo drive feedback system operate in a conventional manner to move the table 12, head assembly 21 and cutting die 20 until their positions are nulled out, i.e., correspond to the machine position represented by $V_h$, $V_a$ and $V_t$ respectively.

Figure 5A:
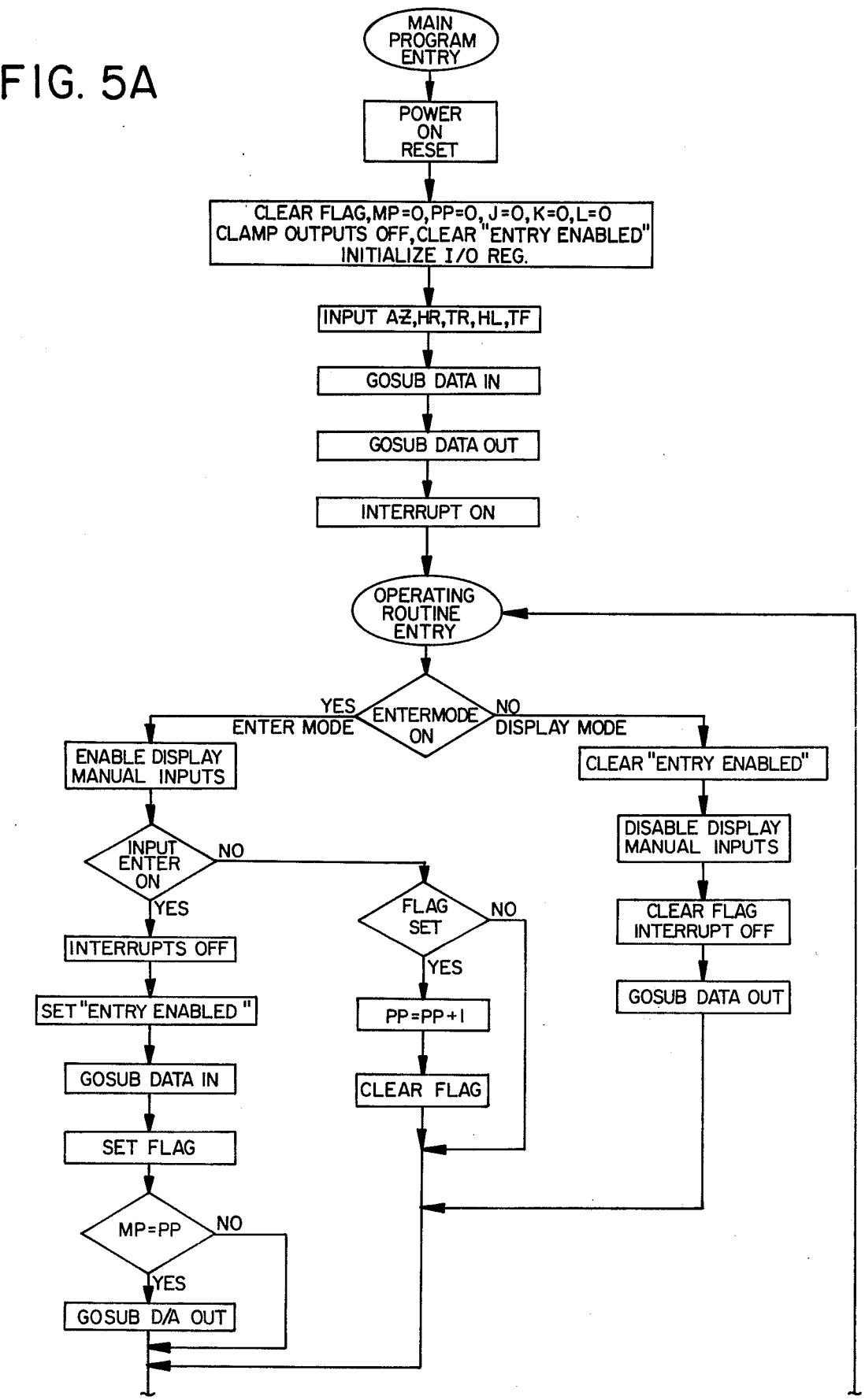
FIG. 5A and 5B represent in combination a flow diagram of the preferred program for the central processing unit microprocessor of the control system of the present invention.
Figure 5B:
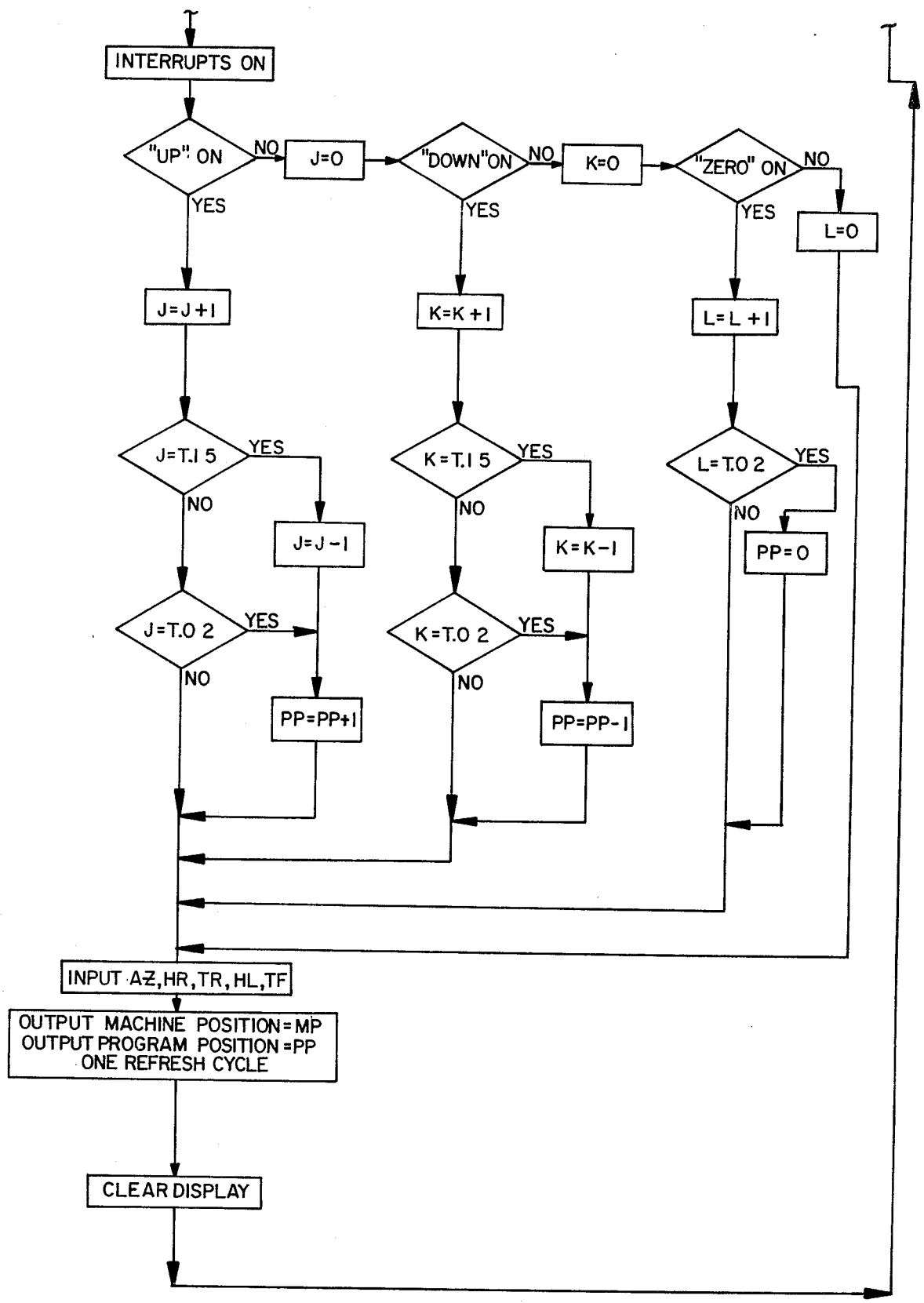

The microcomputer control system 30 of the present invention is a microprocessor based system which is functionally illustrated in FIG. 1 using a single chip central processing unit (CPU) 32 such as the Motorola M6800 in combination with associated system components as hereafter identified. Data storage is provided from a preferably non-volatile random access memory (RAM) 34. If additional data storage memory is required further RAM units may be connected in parallel by connection to the common system buss 35. The program for directing the operation of the central processing unit (CPU) 32 is stored in a conventional programmable read only memory (PROM) 36 such as the Motorola MCM 6870L PROM. The program for the CPU 32 is schematically illustrated by means of its flow diagrams as shown in FIGS. 5A and 5B respectively as will be discussed in greater detail hereafter in connection with the subroutines identified in FIGS. 6A, 6B, 7A, 7B, 8A and 8B respectively. All of the microprocessor system components are standard commercially available components. In fact, depending upon the microprocessor selected some of the required storage memory capability may be integrated into the CPU chip. A commercially available random access scratch pad memory 38 is used as an auxiliary memory to store register data, variables and arbitrary constants and for performing various operations required by the central processing unit as identified by the flow diagrams of FIGS. 5-8 inclusive.

The microprocessor CPU 32 is interfaced through input/output parallel register 40, 42 and 46 to the following units: a control panel of function switches 48 and machine interconnections 50; start and stop position thumb switch controls 52 and 54; machine and program position display counters 56 and 58; input modules 60, 62 and 64 for each of the head, angle and table inputs and the output machine position data modules 66, 68 and 70 respectively. The input/output registers 40, 42 and 46 are commercially available integrated circuits which operate under the control of the CPU 32 to transfer digital data between memory and the input and output modules as will be discussed hereafter in connection with the more detailed schematic diagrams of the control system 30 of FIGS. 2a and 2b.

Figure 2B:
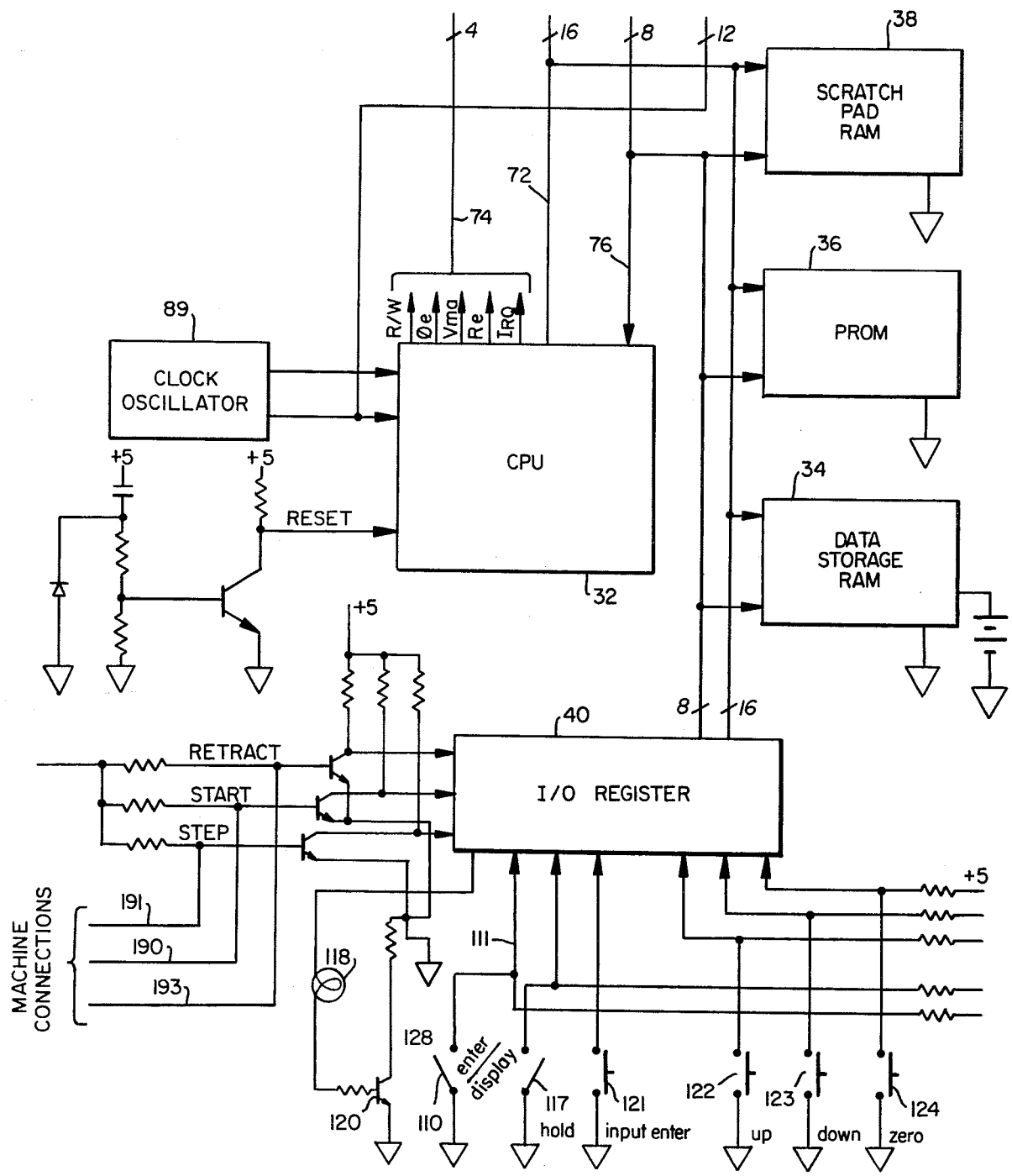

The parallel input/output registers 40, 42 and 46 are split up into 17 line, 31 line and 11 line blocks from four conventional 16 line Motorola MCM6820 CIA units. The input/output registers 40, 42 and 46 are connected in parallel to one another through common 16 wire address buss lines 72, 4 wire buss control lines 74 and 8 wire data buss lines 76. The buss control lines 74 as shown in FIG. 2b include a read/write line which controls the type of operation to be performed, a clock pulse signal line $\phi 2$ for synchronizing timing, a line IRQ for initiating internal interrupts and a reset line Re for resetting the CPU 32 and a line $V_{ma}$ for address buss valid indication. The address buss lines 72 address the desired input/output register under command from the CPU 32 whereas machine position data is transferred from and to memory via the data buss lines 76. In addition the digit select lines 78, 80, 82 and 84 address the desired start and stop thumb switches 52 and 54 and the machine position and program position counters 56 and 58 respectively under command of the CPU 32.

A conventional clock oscillator and driver 89 such as, for example, the Motorola MC 6871A is used to generate the synchronizing clock pulses $\phi 2$ for the entire system 30.

Machine data is accessed from memory under the control of the CPU 32 and transferred through the 17 line parallel input/output register 42 to the output machine head, angle and table position data modules 66, 68 and 70 respectively. The output head position data module 66 represents, in a first embodiment, a serial to parallel shift register 90 in combination with a digital to analog converter module 92 which will be further elaborated upon hereafter.

Figure 2C:
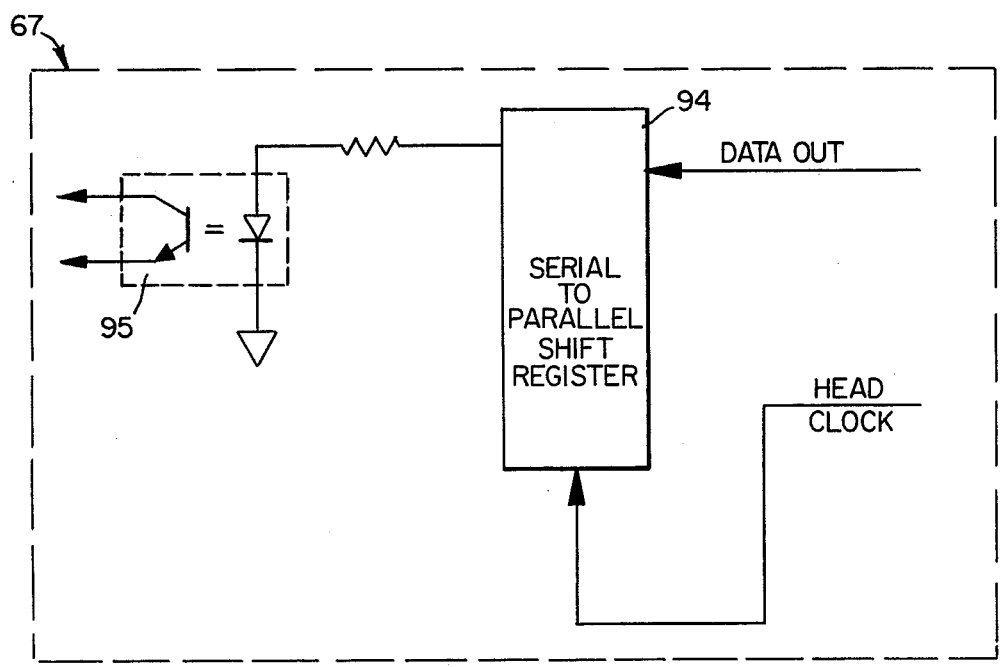

In a second embodiment the output head position data module 66 is replaced with an output head module 67 shown in FIG. 2C including a serial to parallel shift register 94 and a multiplicity of photo isolators 95 (only one of which is shown), e.g., 16 photo isolators for a four BCD digit output. The output angle and table data modules for the second embodiment are constructed identically to the output head data module 67 illustrated in FIG. 2C. In the second embodiment digital data representing a machine position is converted under the control of the CPU 32 to binary data and routed through the input/output register 42 to the serial to parallel shift register 94 from whence it is converted back to BCD data through the multiple photo isolators 95 and transmitted to the die press machine servo feedback controls through digital to analog converters associated with the machine 10. An additional 24 line parallel input/output register 96 identified in FIG. 2A with dotted lines is used in combination with the output head, angle and table data position modules of the second embodiment to permit a "shrink" and "stretch" operation by the use of head, angle and table digital thumb switch controls 98, 100, 102, 104, 106 respectively. Shrink and stretch are terms known to persons familiar with the die press machine art and identify the function of separately adjusting the position of the head, angle and table from their programmed position generally by only a relatively minor amount. The input/output registers 40, 42 and 46 across the buss control lines 74, address buzz lines 72 and the data buss lines 76 respectively.

A cutting program for a given die is defined by a predetermined consecutive sequence of machine positions. Each machine position is, in turn, defined by the three variables, head, angle and table as explained heretofore. The head, angle and table coordinates for each machine position is entered into storage in the random access memory 34 at the address corresponding to the program position display 58. Hundreds or even thousands of cutting programs may therefore be stored in the random access memory limited only by its storage capacity. During machine operation, the cutting die will be at the position indicated by the machine position display 56 leaving the program position display free to be used independently, if desired, to change the stored machine data for any given machine position or preferably to enter new cutting programs. The program position display 58 will also display the program position corresponding to the address in memory when displaying the digital value counterpart of the address in the head, angle and table input modules 60, 62 and 64 respectively.

The operators control panel 48 for the control system 30 includes a plurality of function switches which provide interrupt control to enter or display data, to increment and decrement the program position counter 58, to enter a zero at any given address location, to skip a program position, and to operate the clamps 17 and 18 for securing the stack of paper 14 to the table 12. The machine control interconnections provide control signals from the die press machine representing a start and step control interrupt signal to the CPU 32. An additional head retract interrupt signal is automatically transmitted from the die press controls when the head assembly is raised, after a cutting operation, back up to the home position indicating readiness of the machine to step the cutting die 10 to the next machine position. All of the interrupts are recognized by the central processing unit 32 as a command to follow an interrupt routine sequence of step/retract or start entry instructions set forth in FIG. 6A and 6B.

The operating routine for entering or displaying machine data is initiated by turning on the enter/display function switch 110 on the operators control panel console 48. This places a logical one on line 111 of the input/output register 42 which state is recognized by the microprocessor CPU 32 to initiate the operating routine entry sequence illustrated in the flow diagram in FIG. 5. Anyone skilled in the art of computer programming could write a program based upon the sequence of instructions identified in the flow diagrams of FIG. 5A and 5B.

The head, angle and table machine data values are selected for each cutting position by manually adjusting the ten turn potentiometers 112, 114 and 116. The position of each potentiometer is converted by the input modules 60, 62 and 64 into corresponding digital data. The converted digital data is entered into the random access memory 34 following the sequence of instructions outlined in the microprocessor program illustrated in FIGS. 5A and 5B. Upon recognizing the on state of manually operated function switches 110 and 117 the entry indicator lamp 118 is enabled through drive transistor 120. The indicator lamp 118 provides a visible means for the operator to know that the data entry mode of operation is enabled. Upon depressing the push button function switch 121 the machine data from the input modules 60, 62 and 64 is transferred into storage in the random access memory 34 in a in a position defined by the program position display 58. The program position display 58 is then incremented by depressing the push button function switch 122 to establish a new data address position. The program position display 58 may likewise be decremented by depressing the push button function switch 123. By holding the increment or decrement push button function switches 122 or 123 for a predetermined period of, for example, 1.5 seconds or longer will cause the program position display 58 to begin to rapidly slew up or down respectively. The sequence of program instructions for performing the "up" or "down" operation is shown in the flow diagram of FIG. 5. The letters J, K, L are arbitrarily selected variables stored in the scratch pad random access memory 38. A time period of 0.02 seconds is utilized to assure adequate delay recognition for debounce of the push buttons. A zero may alternatively be entered into the address position defined by the program position display 58 by depressing the push button function switch 124. Upon establishing a new program position additional machine data may be entered into the new address position by depressing the input enter push button function switch 121. This process may be continuously repeated to store any number of machine positions. The machine position from any given starting address to any given final address defines a predetermined cutting program.

Figure 3:
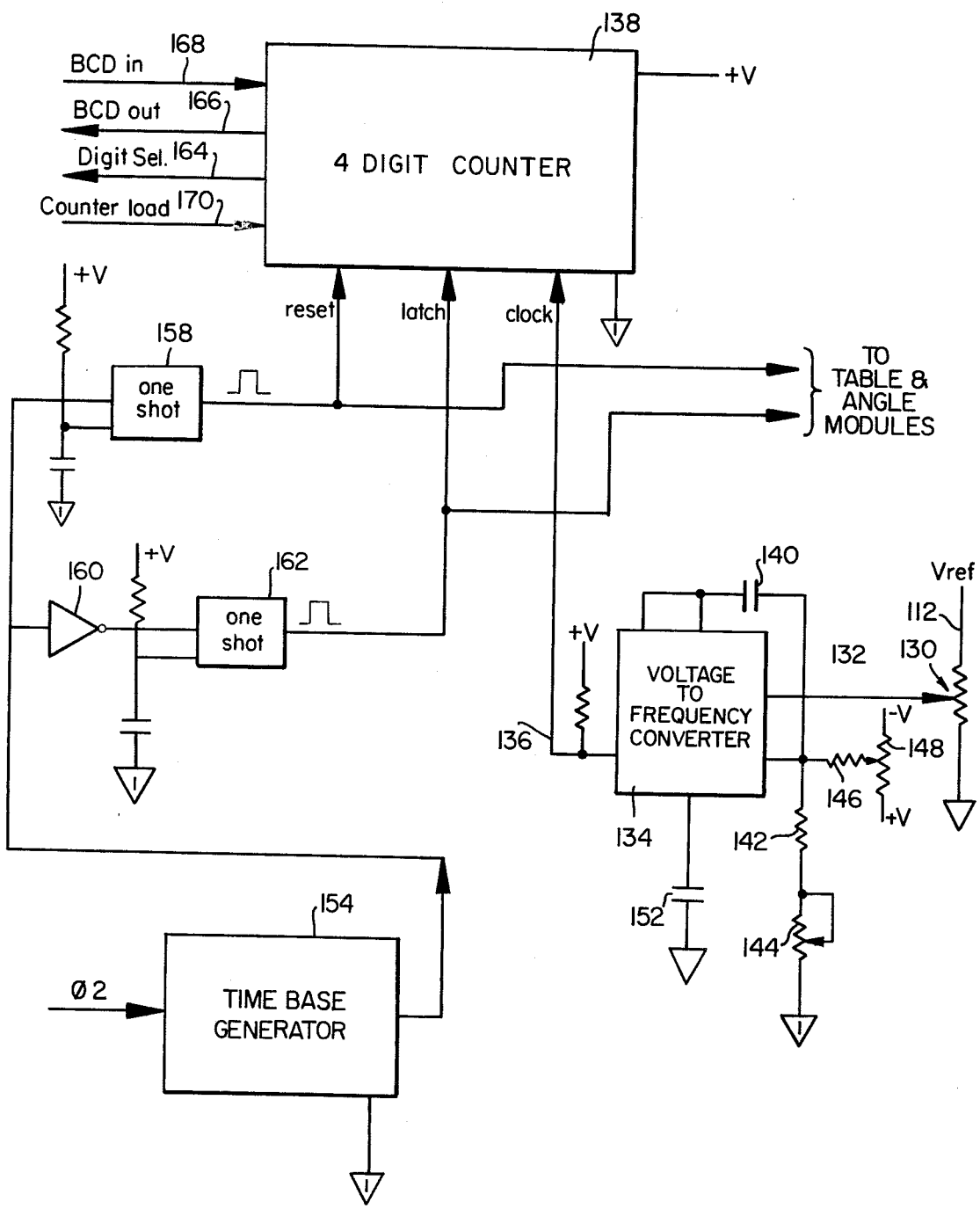
Figure 7A:
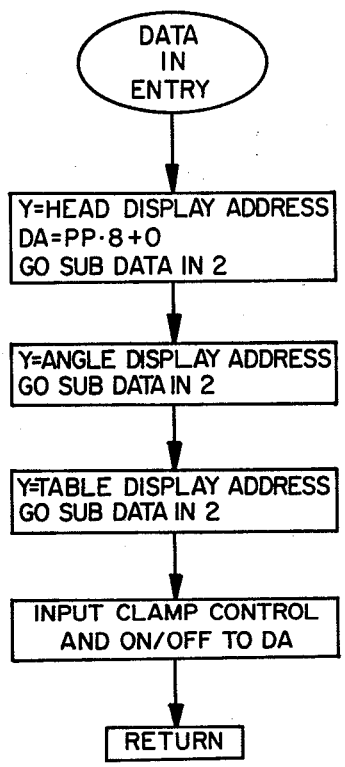
FIG. 7A and 7B are flow diagrams illustrating the data in every subroutine and the data in 2 entry subroutine respectively.
Figure 7B:
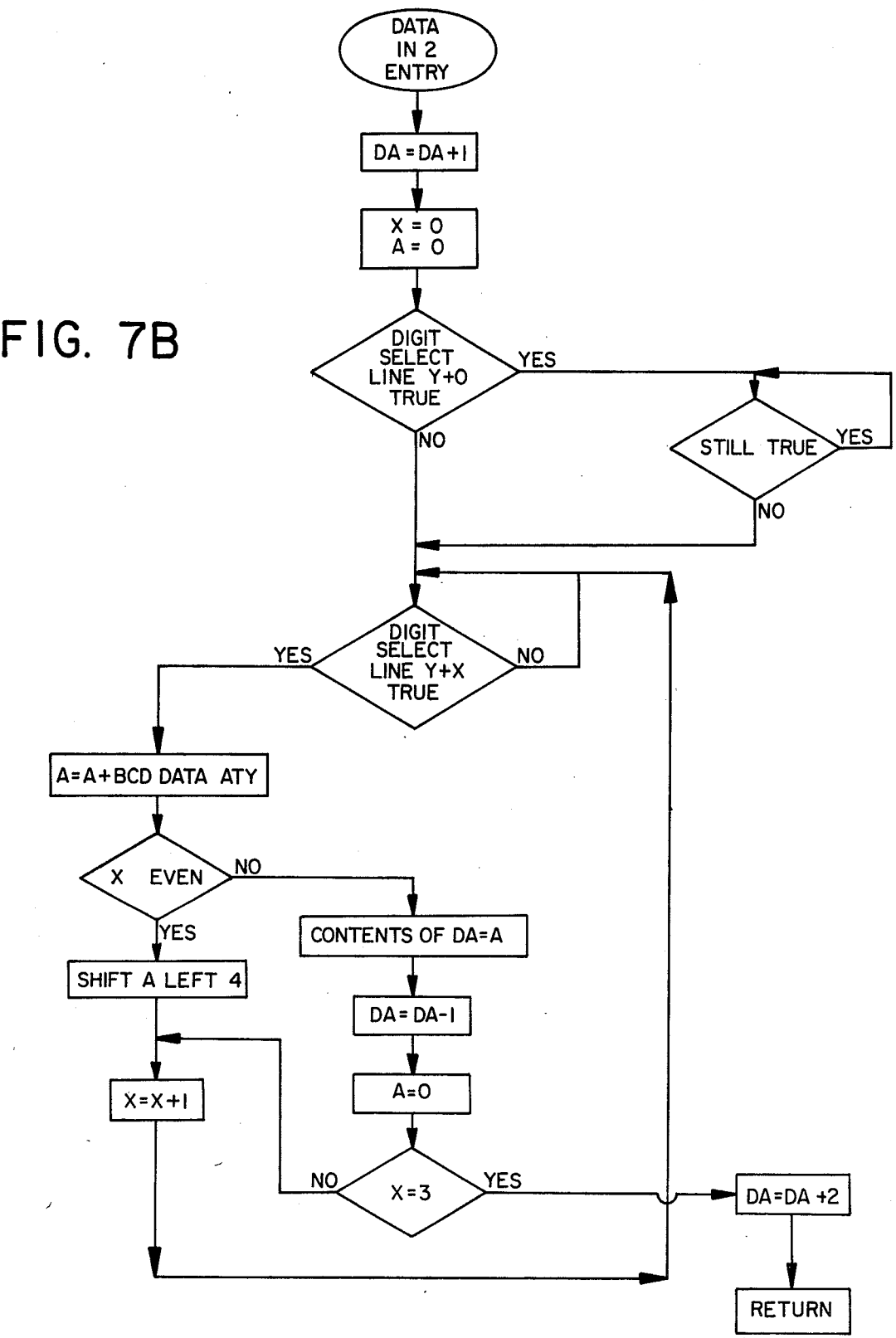
Figure 8A:
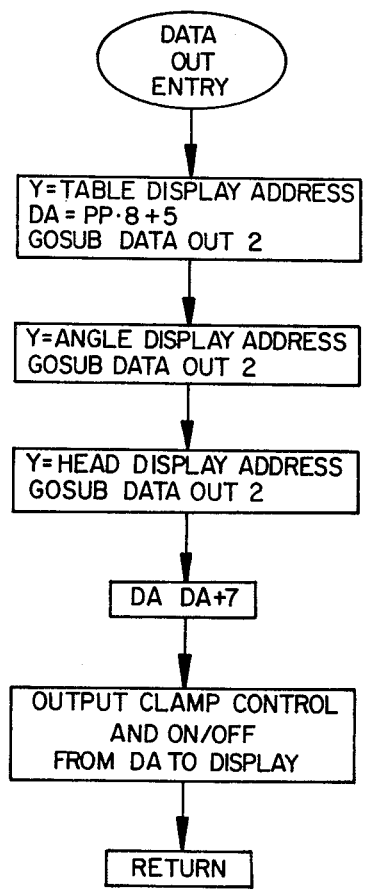
FIG. 8A and 8B are flow diagrams illustrating the data out subroutine and the data out 2 subroutine.
Figure 8B:
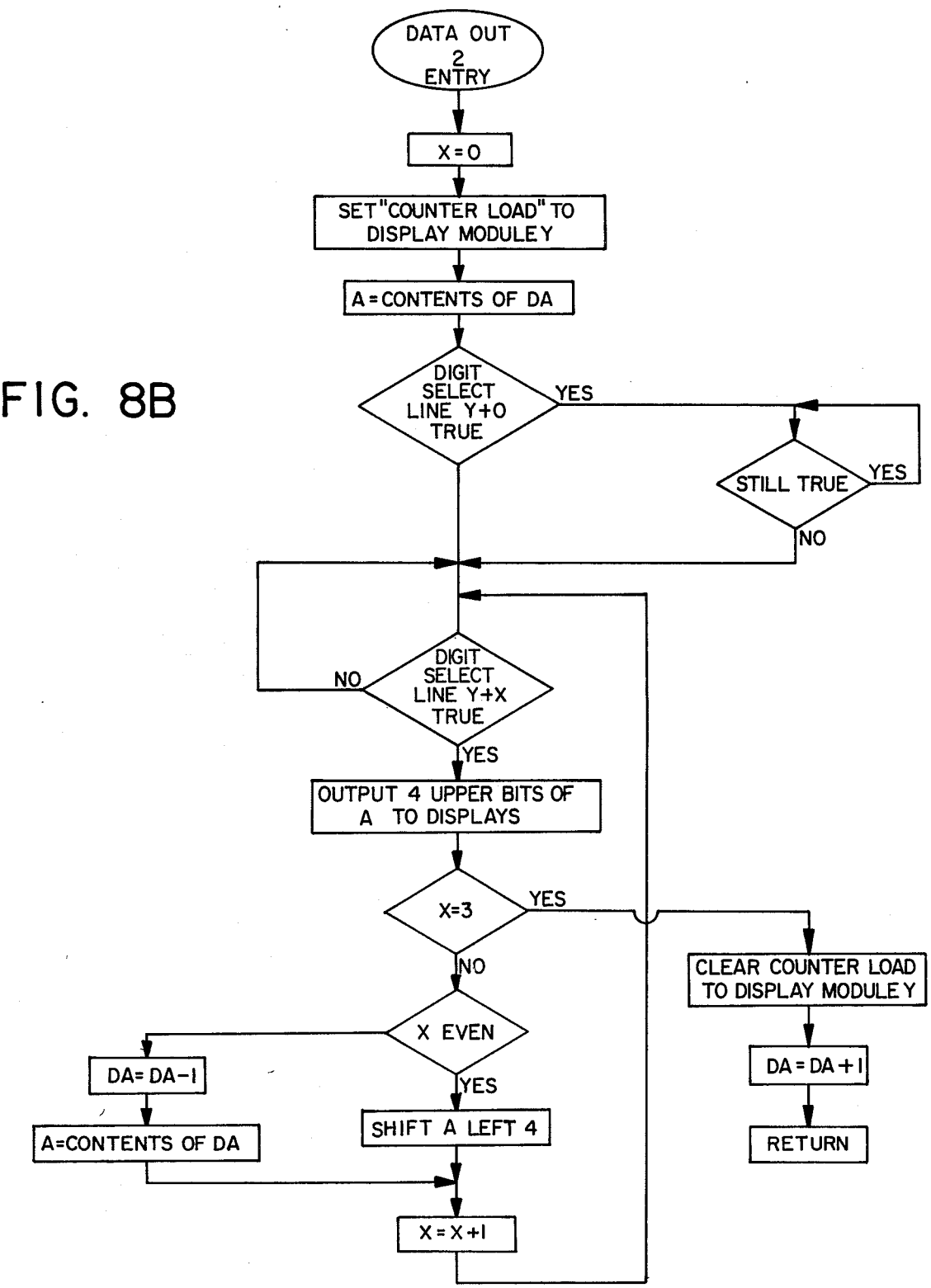

The conversion of the manually selected machine data from the input potentiometers 112, 114 and 116 to digital data occurs in each of the head, angle and table input modules 60, 62 and 64 respectively. The input head module 60 is schematically shown in detail in FIG. 3. The input angle and table modules 62 and 64 are identical to the input head module 60 and have therefor been omitted. The adjusted position of the wiper arm 130 of the head potentiometer 112 provides a voltage 132 proportional to the reference voltage Vref. The voltage 132 is applied as an input to a conventional voltage to frequency converter 134 such as a Burr-Brown, Inc. variable frequency converter. The frequency converter 134 generates an output pulse train 136 having a frequency proportional to the magnitude of the input voltage 132. The pulse train 136 is applied as the clock input signal to a conventional 4 digit counter 138 such as, for example, a IMC Model A400. A capacitor 140, in conjunction with resistors 142 and 144 determines the ratio of frequency to voltage such that for a maximum setting of the head potentiometer 112 the digit counter 138 will display a numerical count of 9999. A zero adjustment network consisting of resistors 146 and 148 permit the counter to display a reading of 0000 at the minimum potentiometer setting. The capacitor 152 is provided to set the pulse width of the variable frequency converter 134 to a convenient value of for example, 1 microsecond. The 1 MHz clock signal $\phi 2$ from the clock oscillator is divided down by the counter chain time base generator 154 to form a time base signal of 5 Hz for use by the digit counters of each of the head, angle and table modules respectively. An RCA CD14518B may be used for the time base generator 154. The time base signal is applied through a first one-shot multivibrator 158 to the reset input of the counter 138 and to a second one-shot multivibrator 162 through the inverter 160. The output pulse from the one-shot 162 is applied to the latch strobe input of the counter 138. The one-shot multivibrators 158 and 162 delay the pulse by 100 milliseconds. The reset pulse sets the count to zero and for the next 100 milliseconds the counter 138 counts the pulses generated by the variable frequency converter 134. At the end of the 100 millisecond period the applied latch strobe pulse terminates the count. The recorded total numerical count displayed by the counter 138 represents a digital value corresponding to the position of the head potentiometer 112. In a similar manner the positions of the angle and table potentiometers are converted to digital values and displayed. The counter 138 is equipped with digit select lines 164, BCD output lines 166, BCD input lines 168 and a counter load signal 170. When the input enter data push button function switch 117 in the operators control panel console 48 is depressed, the digital values corresponding to the manually adjusted wiper arm positions of potentiometers 112, 114 and 116 is converted by the counters in the head, angle and table modules 60, 62 and 64 respectively to binary coded decimal data and transmitted on the BCD output lines 166 in serial fashion in synchronism with digit select signals on lines 164. The digit select signal defines the counter digit location. The BCD data is transferred through the parallel input/output register 46 onto the data buss lines 76 for storage at the program position address corresponding to the program position display 58. BCD data from the input modules is transferred under the control of the CPU 32 following the Data In Entry subroutine illustrated in FIG. 7A. It should be understood that a subroutine such as is shown in FIG. 7A becomes necessary to limit the number of data lines to and from the counter 134. Where speed becomes more critical a more appropriate counter may be used to transfer the data from all of the digit positions in the counter in parallel form instead of series. The DA symbol in the subroutine represents the data address position with memory mapping of 8 bit bytes for each program position. The first two bit bytes are reserved for the head lower and upper byte respectively, the next two for the angle lower and upper byte, the next two for the table lower and upper byte and the last two are reserved for both the clamp on/off control and an expansion space. The letters PP designate the program position.

The counter 138 of the input head module 60 may also be used to display the digital value for the head position at any program position address in memory. Likewise, the digital value for the angle and table positions will also be displayed in the counters associated with the angle and table input modules 62 and 64 respectively. The display mode of operation occurs during the operating entry routine when the enter mode is disabled or turned off. Accordingly, the display mode is functional when the enter/display function switch 110 is closed. This clears the entry enabled indicator 118 and follows a data display subroutine characterized by transferring the contents of memory at the existing machine position through the input/output register 46 to the counter 134 in the input head module and to the corresponding counters (not shown) in the input angle and table modules respectively. This procedure is conducted under command of the CPU 32 and is begun by activating the counter 138 with a counter load signal 170. The counter load signal 170 is set by the input/output register 46 when the CPU 32 recognizes that the enter mode is not on. BCD data is fed from memory through the data buzz lines 76 and routed through the input/output register 46 to the BCD input lines 168 of the counter 138. The digit select lines 164 corresponding to each digit position of the counter 138 is activated by the counter in consecutive sequence. The microprocessor CPU 32 identifies the digit select line and outputs BCD data corresponding to the identified digit position of the counter.

The same buss used to route the BCD data to the input display module 62 is also being used by the program position display 58. The program position display 58 is addressed via the three digit select lines 84 through the input/output register 42 under control of the microprocessor CPU 32. Each of the digit select lines addresses one of the LED positions on the display 58 which is driven through a conventional BCD to 7 segment driver 100 so as to record a digital value corresponding to the BCD data. The machine position display 56 is operated in a similar manner upon being addressed via the three digit select lines 82 for displaying the machine position.

Figure 6A:
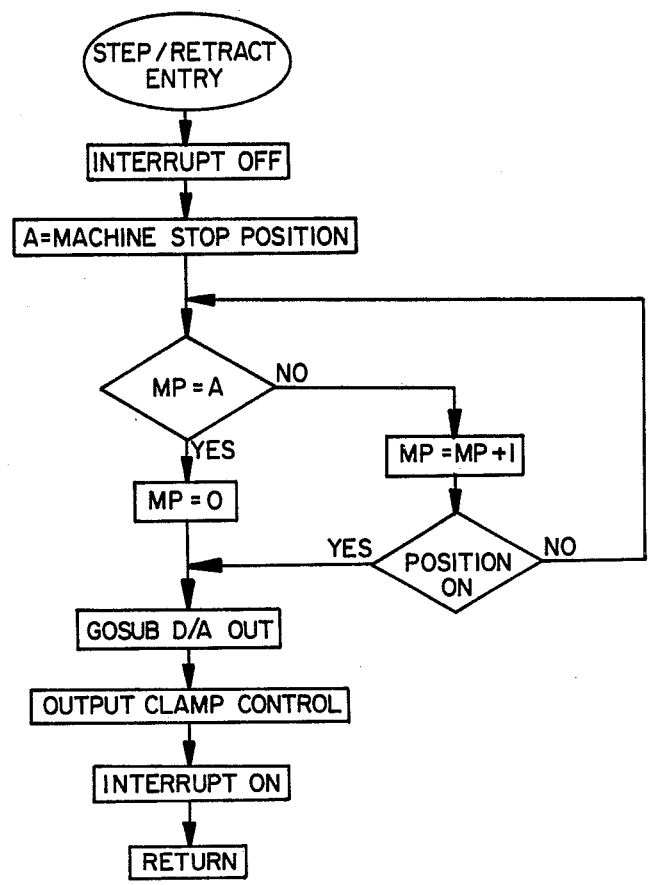
FIG. 6A and 6B are flow diagrams for the step retract entry interrupt routine and the start entry interrupt routine respectively.
Figure 6B:
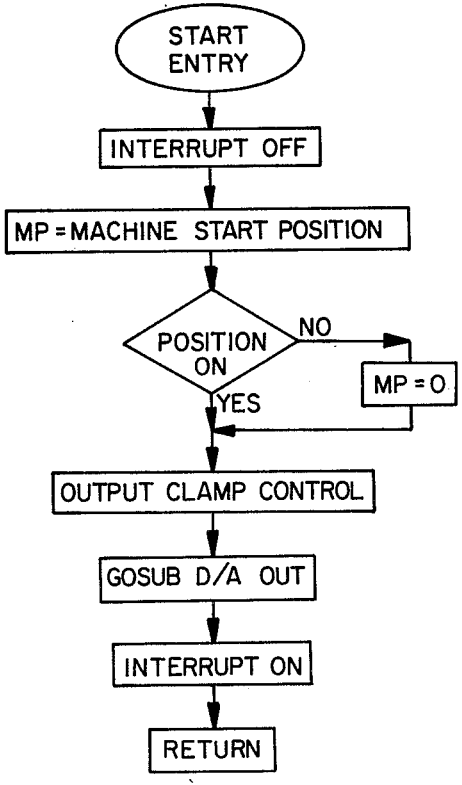

The die press 10 includes an operators start and step control (not shown) which generates the start and step machine control signals 190, 191 shown in FIG. 28. These signals 190, 191 are applied as inputs to the input/output register 40 and operate as interrupt signals to the microprocessor CPU 32. A head retract machine control signal 193 is automatically applied as an additional interrupt when the head assembly returns, following a cutting operation, to its retracted position. The interrupt sequence of program instructions is schematically shown in FIGS. 6A and 6B.

The cutting die 20 is driven by the head, angle and table servo drives 24, 26 and 28 to the machine position corresponding to the signals $V_h$, $V_a$ and $V_t$ which in turn corresponds to the digital value stored in the memory location identified in the machine position display 56. The microprocessor CPU 32 accesses the RAM memory 34 at the address corresponding to the machine position display 54 and routes the BCD data at such address through the input/output register 42 to the head, angle and table output modules 66, 68 and 70 respectively. The CPU 32 follows a sequence of program instructions (not illustrated) involving simply taking the contents in memory at the machine position display location and converting it from BCD to binary before routing it to the input/output register 42. The conversion from BCD to binary is required for compatibility with the conventional digital to analog converters 92 in each of the output modules 66, 68 and 70. A subroutine for conversion of BCD to binary is routine to one skilled in the art of programming.

The output modules 66, 68 and 70 are identical to one another. In the first embodiment shown in FIG. 2 each of the output modules is composed of an electrical isolation photoelectric circuit 200, a serial to parallel shift register 90 and a digital to analog converter module 92. The electrical isolation circuit 200 includes in combination, a photodiode 206 and phototransistor 208 with each having a separate ground reference connection. The ground reference level for the microcomputer system 30 is identified by the reference numeral 1 whereas the ground reference level for the head, angle and table output modules 66, 68 and 70 is identified by the reference numerals 2, 3 and 4 respectively. The phototransistor 208 will conduct current and switch to the "on" or logical zero state in synchronism with current flow through the photodiode 206. In the absence of current flow the phototransistor 208 reverts to the "off" state which is recognized as a logical one by the serial to parallel shift register 90. In the off state the collector 209 of phototransistor 208 rises to the logic supply voltage $V_s$.

The clock signal 210 for the serial to parallel shift register 90 is derived from and in synchronism with the clock signal output from the input/output register 42 of the microcomputer system 30 using an isolation circuit including a photodiode 211 and phototransistor 212 which operate in an equivalent manner to the photo isolation circuit 200. The photo isolator components and the serial to parallel shift register 90 are standard commercially available items.

Each output module 66, 68 and 70 has a separate floating ground reference level 2, 3 and 4 respectively. In the head and table output modules 66 and 70 the floating ground reference level is separately adjustable to provide "shrink" and "stretch" offset variations. The floating ground references 2, 3 and 4 are all derived by simple voltage division from a plurality of series connected preferably precision resistors 215, 216 and 217. These precision resistors are connected in series through adjustable potentiometers 218 and 219 in output module 66 and through potentiometers 220 and 221 in output module 70. The precision resistors 215 and 216 are preferably equal in magnitude to precision resistor 217. A predetermined positive and negative supply voltage of, for example, plus and minus 90 volts supplied by the die press machine 10 for operating the servo drive assemblies is applied across the combination of precision resistors 215, 216 and 217 to establish the ground reference potential 3 in the output angle module 68 and across the adjustable potentiometers 218, 219 and 220, 221 and each precision resistor network in output modules 66 and 70 respectively. Adjustment of the potentiometers 218, 219 and 220, 221 provide shrink-stretch offset adjustment for head and table command signals to the corresponding head and table servos 24 and 28. For angle control no offset adjustment is required. The reference potential Vref to each of the digital to analog converter modules 92, 93, 94 is established by the ratio of resistor 216 to resistor 215.

Figure 4:
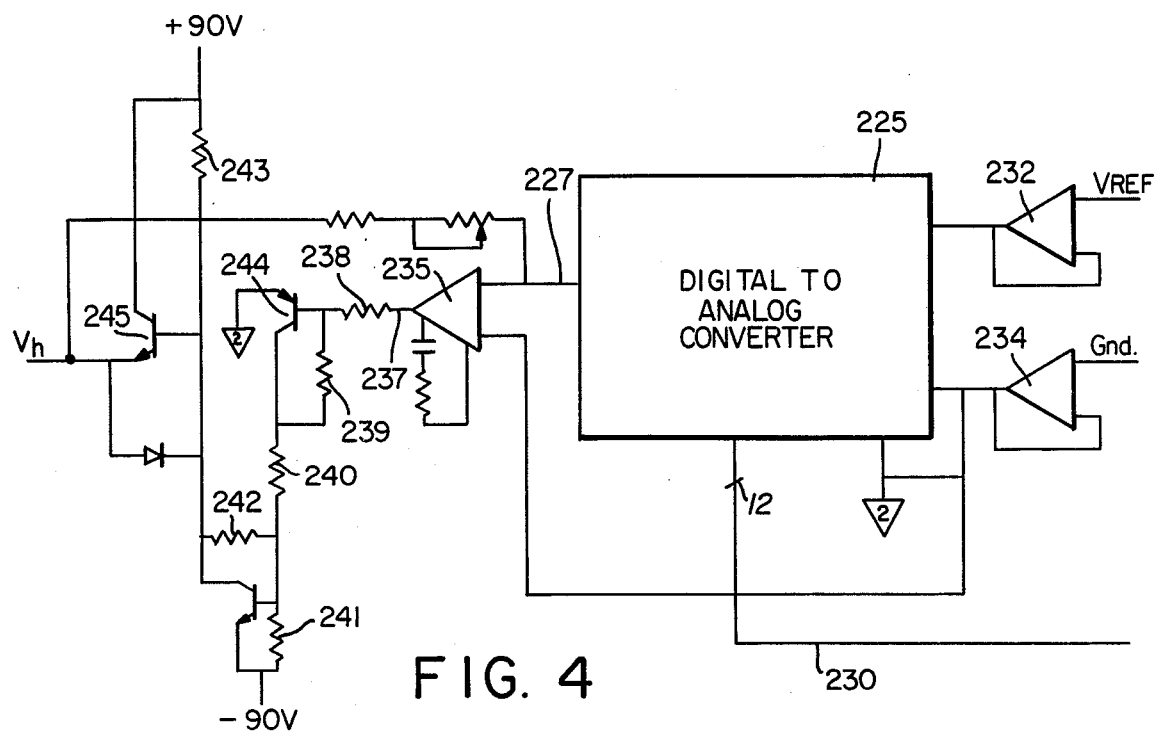
FIG. 4 is a circuit schematic diagram of one of the digital to analog converter modules of FIG. 2A.

Each of the digital to analog converter modules 92, 93 and 94 respectively are identical to one another. For illustrative purposes the converter module 92 is shown in more detail in FIG. 4 and includes a conventional digital to analog converter integrated circuit 225 such as Analog Device Model No. AD565. The D/A converter 225 is adapted to receive 12 bit digital data in parallel form from the 12 line output 230 of the serial to parallel shift register 90. The output from the converter 225 is an analog voltage proportional to the digital value of the 12 bit input data in 2's complement form. Two operation amplifiers 232 and 234 are used as buffers to the converter 225 to prevent the input impedance of the converter 225 from loading down the reference voltage Vref or the floating ground reference levels 2, 3 or 4. The output 227 from the converter 225 is connected to another operational amplifier 235 for generating a low voltage 237 which is converted to a corresponding high voltage output $V_h$ in an appropriate voltage range between +90 volts and −90 volts required by the machine servo drive. The resistor network consisting of resistors 238, 239, 240, 241, 242 and 243 in combination with transistors amplifier 244 provide the necessary voltage amplification to generate $V_h$ through the current amplifier 245.

In the initial setting up of a cutting program before an actual cutting sequence of programmed machine positions is carried out the operator will lay out the stack of paper 14 on the table 12 with the clamps 17 and 18 released. The clamps 17 and 18 may be manually released by opening the function switches 125 and 126. Once properly positioned the function switches are depressed to engage the paper 14. Assuming each cutting program has been programmed into memory as explained heretofore the operator performs a cutting operation by dialing in a start position using the thumb switch 52 and dialing in a stop position using the thumb switch 54. The die press machine 10 upon being actuated will immediately be driven to the machine position coordinates corresponding to the start position. This position will also be displayed in the machine position display 56. Upon receipt of a step or retract head signal the machine position is advanced one position. The subroutine D/A out refers to the four digit conversion from BCD to Binary. The program is completed under the machine position as displayed in the machine position display corresponds to the preset stop position.

The main program illustrated in FIGS. 5A and 5B operates with the input/output registers initialized so that each recognizes an address under command of the CPU 32. Data AZ, HR, and TR correspond to the angle, head and table zero positions and HL and TF correspond to a zero head and table shrink and stretch input when operating in the second embodiment.

It should be understood that many modifications and variations are within the scope of the present invention described by the foregoing specification and defined by the following claims. One such variation includes the use of a plurality of conventional manual settable digital thumb switches (not shown) in place of the ten turn potentiometers 112, 114 and 116 respectively. In this case the head, angle and table input modules 60, 62 and 64 respectively would represent conventional means for converting the digital thumb switch position to binary coded decimal data. These are commercially available integrated units combining the digital thumb switch and BCD conversion functions.

What is claimed is:

1. A microcomputer control system for operating a die press stamping machine including a cutting die mounted in a head assembly over a movable table upon which is located stock material to be die cut by said cutting die following a predetermined cutting program selected from a multiple number of cutting programs each defined by a sequence of programmed machine positions with each position represented by a head, angle and table coordinate respectively, servo drive feedback means for adjusting the relative position between said head assembly and table along transverse axes and for rotating said cutting die in response to command signals generated from said control system in correspondence with each programmed machine position and means for reciprocating said cutting die; said microcomputer control system comprising:

non-volatile random access data storage memory means;

adjustable program position display means for identifying each address location in said memory means;

means for manually presetting the head, angle and table coordinates for each machine position and for converting said preset coordinates into digital data;

means for transferring the digital data for each preset machine position into consecutive address locations in said memory means in a direct correspondence with consecutive settings of said adjustable program position display means such that said data storage memory means contains a multiplicity of programmed machine positions in a consecutive sequence with a first given number of machine positions representing a first cutting program and a second given number of machine positions a second cutting program, etc., thereby forming said multiple number of cutting programs;

means for selecting a predetermined cutting program from said multiple number of cutting programs;

means responsive to the selected program for generating command signals for each machine position within such selected program; and manual input adjustable means for modifying the magnitude of each generated command signal for each of said head, angle and table coordinates respectively so as to accommodate for any variations in any of such coordinates.

2. A microprocessor control system as defined in claim 1 further comprising a machine display means for displaying each machine position corresponding to the command signals generated in conjunction therewith.

3. A microprocessor control system as defined in claim 2 wherein said means for modifying the magnitude of each command signal comprises manually adjustable switch control input means for each of said head, angle and table coordinates respectively, whereby the head, angle and table coordinates are manually adjusted from the programmed machine position defining such coordinates.

4. A microprocessor control system as defined in claim 3 further comprising output means for converting said command signals into analog signal voltages, said output means comprising a serial to parallel shift register and digital to analog conversion means.

5. A microprocessor control system as defined in claim 4 wherein said means for selecting said cutting program comprises means for selecting a start machine position and means for selecting a stop machine position.

6. A microprocessor control system as defined in claims 3 or 5 wherein said means for presetting the head, angle and table coordination for each machine position comprises a plurality of adjustable potentiometers each having a manually adjustable wiper arm whose analog position defines a predetermined machine position coordinate and means for convering each preset position to a digital value.

* * * * *